3,686,232
ANTHRAQUINONES
Walter Hohmann and Klaus Wunderlich, Leverkusen, and Hans-Samuel Bien, Burscheid, Germany, assignors to Farbenfabriken Bayer Aktiengesellschaft, Leverkusen, Germany
No Drawing. Filed June 24, 1970, Ser. No. 49,526
Claims priority, application Germany, June 27, 1969,
P 19 32 646.6; Mar. 23, 1970, P 20 13 789.7,
P 20 13 790.0
Int. Cl. C09b 1/54
U.S. Cl. 260—379                                    1 Claim

ABSTRACT OF THE DISCLOSURE

Compounds of formula

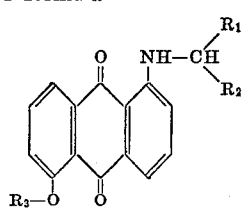

wherein $R_1$ and $R_2$ independently of one another denote optionally substituted alkyl radicals with 1–3 C atoms and $R_3$ represents hydrogen or an optionally substituted alkyl radical with 1–5 C atoms, as well as compounds of the formula

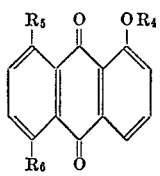

wherein $R_4$ represents an alkyl group which is optionally substituted by hydroxyl or alkoxy groups, and $R_5$ and $R_6$ represent hydrogen or an amino group which is monosubstituted or disubstituted by a straight-chain alkyl group or a cycloalkyl group, with the proviso that $R_5$ and $R_6$ do not simultaneously represent hydrogen, and processes for their production.

---

The subject of the invention are new compounds of general formula

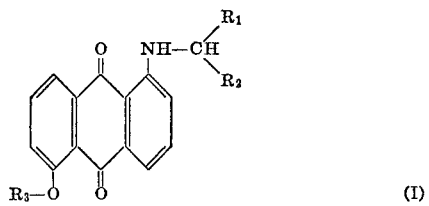   (I)

as well as a process for their manufacture.

In Formula I, $R_1$ and $R_2$ independently of one another denote optionally substituted lower alkyl radicals with 1–3 C atoms, and $R_3$ denotes hydrogen or a lower optionally substituted alkyl radical with 1–5 C atoms.

As alkyl radicals $R_1$ and $R_2$ there may for example be mentioned: methyl, ethyl, propyl, hydroxymethyl, β-hydroxyethyl, β-cyanethyl, β-chlorethyl, and β-γ-dihalogenopropyl, such as β-γ-dibromopropyl radicals.

Possible radicals $R_3$ are for example: methyl, ethyl, β-hydroxyethyl, β-methoxyethyl, β-ethoxyethyl, β-(β'-methoxyethoxy)-ethyl; β-(β'-ethoxy-ethoxy)-ethyl; n- or isopropyl, and n- or iso-butyl radicals.

The compounds according to the invention are valuable intermediate products for the synthesis of novel organic dyestuffs. The corresponding new dyestuffs are for example obtained if compounds of general Formula I are monobrominated in the p-position to the isoalkylamino group of the anthraquinone ring system, for example in dilute mineral acids or in inert organic solvents at room temperature or slightly elevated temperature, and if subsequently the bromine atom is for example replaced by amines, acid amides or mercaptans.

The new compounds of Formula I are manufactured by reacting compounds of general formula

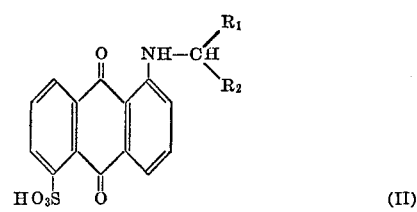   (II)

or their alkali salts, preferably the sodium or potassium salts, at elevated temperature, with alkali hydroxides, preferably sodium or potassium hydroxide, and alcohols of general formula $$R_3'OH \quad (III)$$

wherein $R_3'$ represents an optionally substituted lower alkyl radical, and the compounds thus obtained, of formula

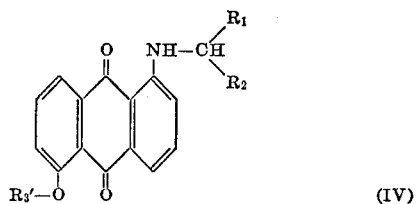   (IV)

wherein $R_1$, $R_2$ and $R_3'$ have the significance already indicated, are optionally treated with aqueous mineral acids, preferably aqueous sulphuric acid, at elevated temperature. If dilute sulphuric acid is used as the aqueous mineral acid, $H_2SO_4$ concentrations of between about 60 and about 80% are particularly suitable.

Temperatures of 60°–120° C. are suitable for the reaction of the compounds of Formula II. At the same time 0.1 to 0.8, preferably 0.2 to 0.5, mol of alkali hydroxide are in general employed per mol of alcohol $R_3'OH$. The reaction time can be varied within wide limits; for 1 molar batches the reaction time can be ½ to 4 hours. At the same time it is possible, by a suitable choice of temperature, reaction time, nature of the alcohol and ratio of alkali hydroxide/alcohol $R_3'OH$, either to achieve a selective replacement of the sulphonic acid group by the alkoxy group or predominantly by the hydroxyl group, with either compounds of Formula IV or I, $R_3$=optionally substituted lower alkyl radical with 1–3 C atoms, or compounds of Formula I, $R_2$=hydrogen, being formed. Mixtures of 1-isoalkylamino-5-alkoxy- and 1-isoalkylamino-5-hydroxy-anthraquinones of the most diverse composition can also be manufactured in this manner.

Instead of alkali hydroxides and alcohols, it is of course also possible to employ the corresponding alcoholates in the reaction.

The bromination already mentioned, for the manufacture of further valuable intermediate products for the synthesis of novel anthraquinone dyestuffs can of course be carried out immediately following the acid saponification in the same reaction vessel, in order, for example, to manufacture 1 - isoalkylamino - 5 - hydroxy - 4 - bromanthraquinone.

Starting compounds of Formula II for the process according to the invention are, for example, 1-isopropylamino-, 1-sec.-butylamino-, pentylamino-(3')- and 1'-hydroxybutylamino-(2')-anthraquinone-5-sulphonic acid, or their alkali salts. They can be obtained by reaction of sodium anthraquinone-1,5-disulphonate with isopropylamine, sec.-butylamine, 3-amino-pentane and 1-hydroxy-2-amino-butane in an aqueous medium in the presence of an oxidising agent such as for example sodium m-nitrobenzenesulphonate, optionally with the addition of magnesium oxide and catalytic amounts of a copper salt, such as for example copper-II sulphate, in an autoclave at temperatures of 110°–150° C., as is for example described for the sodium salt of 1-isopropylamino-anthraquinone-5-sulphonic acid in Belgian patent specification 729,177.

Suitable alcohols $R_3'OH$ for the reaction according to the invention are for example methanol, ethanol, ethylene glycol, ethylene glycol monomethyl ether, ethylene glycol monoethyl ether, diethylene glycol monomethyl ether and diethylene glycol monoethyl ether.

Compounds of Formula I, wherein $R_3$ denotes hydrogen, can also be obtained according to a known process by so-called lime pressure melt, that is to say reaction of compounds of Formula II with an aqueous solution of calcium oxide and magnesium chloride under pressure at temperatures of 180°–220° C. This process is for example described in French patent specifications 336,867 and 336,938.

The process according to the invention offers several advantages relative to the process of the lime pressure melt, such as the greater breadth of application, which for example also comprises the manufacture of the alkoxy compounds of Formula I, wherein $R_3$ represents a lower optionally substituted alkyl radical with 1–5 C atoms; also, the reaction temperatures, which are more than 100° C. lower and which permit the reaction to be carried out without pressure; finally, better space-time yields and purer end products.

A further subject of the present invention are alkoxy-anthraquinones of general formula

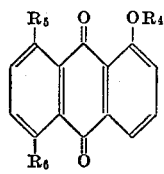

(V)

wherein $R_4$ represents an alkyl group which is optionally substituted by hydroxyl or alkoxy groups and $R_5$ and $R_6$ represent hydrogen or an amino group monosubstituted or disubstituted by a straight-chain alkyl group or a cycloalkyl group, with the proviso that $R_5$ and $R_6$ do not simultaneously represent hydrogen.

As alkyl groups $R_4$ there should especially be mentioned: alkyl groups with 1–4 C atoms such as methyl, ethyl, butyl, hydroxyethyl, methoxyethyl, ethoxyethyl, methoxyethoxyethyl and ethoxyethoxyethyl.

As radicals $R_5$ and $R_6$ there should especially be mentioned:

mono-$C_1$-$C_4$-n-alkylamino, di-$C_1$-$C_4$-n-alkylamino and cyclohexylamino radicals.

A further subject of the present invention is a process for the manufacture of 1-alkoxy-anthraquinones of formula

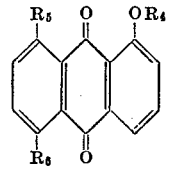

(VI)

The process is characterised in that anthraquinone-1-sulphonic acids of formula

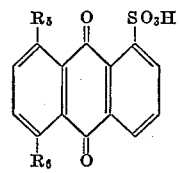

(VII)

or their alkali salts are reacted, preferably in a weight ratio of about 0.3–0.75:1, with alcohols of formula

$R_4$—OH     (VIII)

at temperatures of about 50–90° C. in the presence of alkali hydroxides or alkali alcoholates.

In Formulae VI–VIII:

$R_4$ represents an alkyl group which is optionally substituted by hydroxyl or alkoxy groups, and $R_5$ and $R_6$ represent hydrogen or an amino group which is optionally monosubstituted or disubstituted by straight-chain alkyl groups or cycloalkyl groups, with the proviso that $R_5$ and $R_6$ do not simultaneously represent hydrogen.

Suitable alkali salts are especially the sodium and potassium salts, and suitable amino groups are, in addition to the $NH_2$ group, amino groups which are monosubstituted or disubstituted by $C_1$-$C_4$-n-alkyl or by cycloalkyl groups.

As alcohols (VIII), methanol, ethanol, butanol, ethylene glycol, ethylene glycol monomethyl ether, ethylene glycol monoethyl ether, diethylene glycol monomethyl ether and diethylene glycol monoethyl ether should especially be mentioned.

Suitable starting compounds (VII) are, for example, 1-amino-, 1-methylamino-, 1-cyclohexylamino-, 1-n-propylamino-5- and -8-sulphonic acid or their sodium or potassium salts.

The reaction times can be varied within wide limits. They are in general about ½ hour to several hours.

Possible alkali hydroxides are especially sodium or potassium hydroxide in the solid form or in the form of concentrated aqueous solutions. Here generally 0.1–0.8 mol, preferably 0.2–0.4 mol, of alkali hydroxide or alkali alcoholate such as sodium or potassium methylate or ethylate are used per mol of alcohol employed.

The compounds of Formula V are new. They dye polyamide and polyester fibres in clear orange-red shades and represent valuable intermediate products for the synthesis of dyestuffs. They can for example be converted into dispersion dyestuffs by nitration and subsequent reduction and optionally subsequent halogenation, for example with bromine.

1-amino-5-methoxyanthraquinone and 1-amino-8-methoxyanthraquinone are known from British patent specifications 264,561 and 459,770. They were obtained by reaction of 1-amino-5-chlor-anthraquinone or 1-amino-8-chloranthraquinone with methanolic alkali. The chlorine compounds employed as starting products are industrially only obtainable by replacement of the sulpho groups by chlorine. Against this, the process according to the invention offers the possibility of obtaining the compounds (VI) in one reaction step from the 1-amino-5(8)-sulphonic acids in a simple manner and in very good yields, and is hence considerably more economical.

A further subject of the present invention is a process for the manufacture of 1-alkoxyanthraquinones of general formula

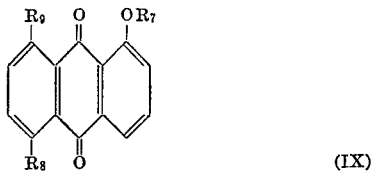

(IX)

wherein $R_7$ represents an optionally substituted alkyl group, whilst $R_8$ and $R_9$ represent hydrogen, a hydroxyl group or an optionally substituted alkoxy group.

The process is characterised in that anthraquinone-1-sulphonic acids of general formula

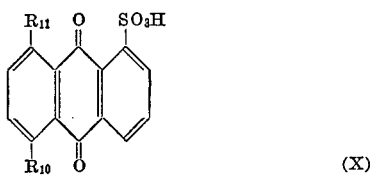

(X)

or their alkali salts are reacted at temperatures of about 20–50° C., preferably 20–40° C., in the presence of alkali hydroxides or alkali alcoholates, preferably in amounts of 0.1 to 0.8 mol, preferentially 0.2 to 0.4 mol, per mol of alcohol (XI) employed, optionally in the presence of water and unreactive water-soluble solvents, in a weight ratio of about 0.3 to 0.75:1, with alcohols of formula

$R_7OH$ (XI)

wherein $R_7$ represents an optionally substituted lower alkyl group, preferably a methyl group, and $R_{10}$ and $R_{11}$ denote hydrogen, halogen, preferably chlorine, nitro, hydroxyl or the sulpho group or its alkali salt.

Suitable alcohols of Formula XI are especially lower alcohols which are optionally substituted by hydroxyl or lower alkoxy groups, such as methanol, ethanol, butanol, ethylene glycol, ethylene glycol monomethyl ether, ethylene glycol monoethyl ether, diethylene glycol monomethyl ether, and diethylene glycol monoethyl ether. Methanol is at the same time especially preferred.

During the reaction, halogen or nitro groups which are optionally present may be converted into alkoxy groups.

In the series of the disulphonic acids, the replacement of the sulpho group by the alkoxy group here takes place more smoothly in the 1,5-series than in the 1,8-series.

Suitable starting compounds (X) are, for example, anthraquinone-1-sulphonic acid, anthraquinone-1,5 - disulphonic acid, anthraquinone-1,8-disulphonic acid, 1-hydroxy-, 1-chlor- and 1-nitro-anthraquinone-5-sulphonic acid or -8-sulphonic acid or their alkali salts, especially their sodium or potassium salts.

The reaction times can be varied within wide limits. In general they are ½ to 50 hours, depending on the starting compound and the reaction temperature.

The substitution in general already takes place at room temperature, with a rise in temperature to 30–40° C. occurring as a result of the heat of reaction. A possible alkali hydroxide is especially sodium hydroxide in the solid form or in the form of aqueous solutions.

Suitable unreactive solvents to be optionally conjointly used are, for example, dioxane, dialkylformamides, for example dimethylformamide, dialkylsulphoxides, for example dimethylsulphoxide, optionally N-alkylated lactams for example caprolactam or N-methylpyrrolidone.

The process yields very pure products, which do not have to be purified further for further reactions, in a simple manner and in high yields. If on the other hand the process is carried out at temperatures above 50° C., a rapid lowering of the quality and of the yield occurs as the temperature rises. If for example the process is carried out at the boil, completely unusable products which are coloured greenish-black are obtained in very poor yields.

German patent specification 156,762 already describes the reaction of potassium anthraquinone-1-sulphonate and sodium anthraquinone-1,5-disulphonate or sodium anthraquinone-1,8-disulphonate with methanolic sodium hydroxide solution at the reflux temperature, in dilute solution, to give the corresponding methoxy compounds. However, as emerges from J. Chem. Soc. (London), 1948, page 736, the methoxy compounds are only obtained in very poor yield and purity according to this process.

It was therefore surprising and unforeseeable that in accordance with the process of the invention, pure products are obtained in high yields on working in concentrated solution at low temperatures.

The compounds of Formula IX are known. They represent intermediate products for the manufacture of dyestuffs and dyestuff precursors. They can for example be converted into valuable dispersion dyestuffs by nitration and reduction. Of course the corresponding hydroxyanthraquinone compounds can also be obtained in very good yields and with excellent quality by saponification of the alkoxy groups, for example in aqueous sulphuric acid at elevated temperature.

The parts indicated in the examples are parts by weight unless otherwise stated. The temperatures are degrees centigrade.

EXAMPLE 1

(a) 160 parts of NaOH are dissolved in 600 parts by volume of methanol at the boil and 200 parts of sodium 1 - isopropylamino-anthraquinone - 5 - sulphonate (89% strength) are introduced so rapidly into this solution, with intensive stirring, at 80° C., that the melt always remains easy to stir (about 30 minutes are required). The mixture is now heated to 80°–85° for such length of time (about 30 minutes) that in a sample which is withdrawn and chromatographed starting material can only still be detected in traces. The mixture is diluted with 1000 parts of hot water and the product is filtered off at 70°–80°, washed with hot water until neutral and dried in vacuo.

135 parts (95% of theory) of 1-isopropylamino-5-methoxyanthraquinone, which still contains 2% of 1-isopropylamino-5-hydroxy-anthraquinone, are obtained.

(b) 100 parts of the product obtained according to (a) are stirred into 200 parts by volume of 70% strength sulphuric acid and stirred at 120° until no further starting material can be chromatographically detected in a sample which is withdrawn (about 2½ hours are required). The mixture is now diluted with 100 parts of water at 50°–60°, left until a precipitate has been produced, heated to 90°–95° with slow addition of a further 30 parts of water, and stirred for about a further 15 hours in the cold. The product, which has separated out well in the form of crystals, is filtered off using a G3-frit, and the filter residue is washed with 50% strength $H_2SO_4$ until the effluent is a clear light yellow, and is introduced into 500 parts of cold water with stirring, filtered off, washed until neutral and dried. 87 parts of 1-isopropylamino-5-hydroxyanthraquinone (91.5% of theory) containing 1% of 1-amino-5-hydroxy-anthraquinone are obtained.

(c) Comparison experiment according to the process of French patent specifications 336,867 and 336,938 (lime pressure melt); 220 parts of sodium 1-isopropylamino-anthraquinone-5-sulphonate, 144 parts of ground calcium oxide, 161 parts of 28% strength magnesium chloride solution and 1780 parts of water are warmed for 18 hours to 200–210° in a stirred autoclave.

The product is filtered off, the filter residue is washed with hot water until approximately neutral and stirred into 1000 parts of water, 1000 parts by volume of 30% strength hydrochloric acid are added, the mixture is stirred at 95–100° until all the Ca salt has been decomposed (about 1–2 hours are required), and the product is filtered off, washed with hot water until neutral and dried. 149 parts=91% of theory of 1-isopropylamino-5-hydroxy-anthraquinone are obtained. The product contains more impurities than that obtained according to Example 1b, for example significantly more 1-amino-5-hydroxyanthraquinone.

(d) If, in Example 1a, a mixture of 550 parts by volume of methanol+50 parts of water is employed instead of 600 parts by volume of methanol, 1-isopropylamino-5-methoxy-anthraquinone is again obtained in very good yield.

EXAMPLE 2

If the procedure of Example 1a is followed but 210 parts of sodium methylate are employed instead of 160 parts of NaOH, 1-isopropylamino-5-methoxy-anthraquinone is again obtained in almost quantitative yield.

EXAMPLE 3

A solution of 9.1 parts of NaOH in 36 parts of methanol and 4 parts of ethylene glycol monomethyl ether is prepared in an iron kettle having an anchor stirrer and reflux condenser. 20 parts of sodium 1-isopropylamino-anthraquinone-5-sulphonate (94% strength) are introduced into this solution at 75–80° over the course of 2 hours whilst stirring, the mixture is stirred for a further hour at 83°–85°, the kettle is filled up with hot water, and the product is filtered off on a stoneware filter, washed with hot water until neutral and squeezed out thoroughly. 24.4 parts of press cake containing 40.7% of water are obtained.

This press cake is introduced with intensive stirring into 34.7 parts of 90% strength sulphuric acid, the solution is warmed to 120°–125° until no further 1-isopropylamino - 5 - methoxy-anthraquinone is chromatographically detectable in a worked-up sample (about 3 hours are required) and is diluted with 18 parts of water at 50°–80°, the mixture is stirred overnight in the cold, and the sulphate which has precipitated in large boat-shaped plates is filtered off, washed with 50% strength sulphuric acid, decomposed with water, and the product washed until neutral and dried. 12.9 parts (90% of theory) of 1-isopropylamino - 5 - hydroxy - anthraquinone are obtained.

EXAMPLE 4

(a) The procedure described in Example 3 is followed, but after dilution with 18 parts of water the product is not filtered off as described in Example 3 but instead 10.6 parts of bromine are added at room temperature with intensive stirring and the mixture is further stirred, optionally at a temperature raised to up to 40° C, until less than 5% of 1-isopropylamino-5-hydroxyanthraquinone can be detected in a sample which has been withdrawn, worked-up and chromatographed. The mixture is diluted with 95 parts of water, stirred for some time longer, unreacted bromine is reduced with the particular requisite amount of bisulphite liquor, and the product is filtered off, washed until neutral and dried. 17.4 parts of isopropylamino-4-bromo-5-hydroxy-anthraquinone are obtained, representing 94% of theory relative to sodium 1-isopropylamino-anthraquinone-5-sulphonate.

(b) If the 12.9 parts of 1-isopropylamino-5-hydroxy-anthraquinone obtained in Example 3 are dissolved in 130 parts of 30% strength hydrochloric acid, 9.5 parts of bromine are added dropwise at room temperature, and the mixture is further stirred at room temperature or at elevated temperature (up to 40°) until at most 5% of 1-isopropylamino-5-hydroxy-anthraquinone can still be detected chromatographically in a sample which has been withdrawn, then 15.95 parts of 1-isopropylamino-5-hydroxy-4-bromanthraquinone are obtained after pouring out into 300 parts of water and further working-up as described in (a). The quality of this product is only slightly better than that of the product obtained according to Example 4a.

(c) 36 parts of 1-isopropylamino-4-bromo-5-hydroxyanthraquinone, obtained according to Example 4b, are introduced into 108 parts of molten p-toluenesulphamide at 150° and the resulting solution is mixed with 25 parts of potassium acetate and 0.7 part of basic copper acetate. A rapid conversion takes place in an exothermic reaction and in the course thereof the temperature is allowed to rise up to 165°. When no further starting material can be detected chromatographically in a sample which has been withdrawn (about 30 minutes are required), the melt is promptly diluted with 150 parts of methanol and the reaction product which has separated out in coarse crystals is filtered off at 50°–60° and washed with boiling hot methanol until a clear blue effluent is obtained, and finally with hot water. After drying, 33.7 parts of 1-isopropylamino-4-p-toluenesulphamido - 5 - hydroxy-anthraquinone are obtained.

When converted to a finely divided form this product dyes polyester fibres according to usual dyeing processes in a violet-blue shade.

(d) 10 parts of the product obtained according to Example 4c are treated in 100 parts of 70% strength sulphuric acid at 60–65° until no further starting material can be detected chromatographically in a sample which has been withdrawn (about 30 minutes are required). The mixture is introduced into 1000 parts of cold water with stirring, and the resulting precipitate is filtered off, washed until neutral and dried. 6.5 parts of 1-isopropylamino-4-amino-5-hydroxy-anthraquinone are obtained.

When converted to a finely divided form, this product dyes synthetic polyamide and polyester fibres in blue shades.

(e) 2 parts of the product obtained according to Example 4d are stirred in 20 parts of 12% strength oleum at room temperature until only traces of the starting material can still be detected chromatographically in a worked-up sample.

After pouring out into dilute sodium chloride solution, neutralising with alkali and washing with dilute sodium chloride solution, the Na salt of a monosulphonic acid of 1-isopropylamino-4-amino-5-hydroxy-anthraquinone is obtained, which dyes natural and synthetic polyamide fibres according to customary dyeing processes in blue shades.

EXAMPLE 5

(a) 42 parts of NaOH are dissolved in 150 parts of ethylene glycol monomethyl ether at 80°–90° in an open flask, and 45 parts of sodium 1-isopropylamino-anthraquinone-5-sulphonate are promptly added to this solution at 70° with an intensive stirring. The mixture is stirred for a further 20 minutes at the same temperature, diluted with 200 parts of water, and the product filtered off, washed with boiling hot water until neutral and dried at 60° in vacuo. 30 parts of 1-isopropylamino-5-ω-methoxy-ethoxy-anthraquinone are obtained, containing 2–3% of 1-isopropylamino-5-hydroxy-anthraquinone.

(b) 5 parts of the product obtained according to (a) are stirred in 50 parts of 75% strength $H_2SO_4$ for 75 minutes at 120°–125° and are subsequently diluted at 50°–60° with such an amount of water that a 50% strength $H_2SO_4$ is produced. The crystals of the sulphate which have separated out are filtered off at room tempreature and washed with about 45% strength $H_2SO_4$, the sulphate is decomposed with water, and the product is washed until neutral and dried. 3.4 parts of 1-isopropylamino-5-hydroxy-anthraquinone are obtained. During the saponification, 1-isopropylamino - 5 - β - hydroxy-ethoxy-anthraquinone can transiently be detected chromatographically.

EXAMPLE 6

(a) 42 parts of NaOH are dissolved in 150 parts of diethylene glycol monomethyl ether in an open flask, 45 parts of sodium 1-isopropylamino-anthraquinone - 5 - sulphonate are promptly added to this solution at 60°, and the mixture is stirred for a further 30 minutes at the same temperature and worked-up as described in Example 5a. 30.6 parts of 1-isopropylamino-5-β-(ω-methoxy-ethoxy)-ethoxy-anthraquinone are obtained.

(b) 3.3 parts of 1-isopropylamino-5-hydroxy-anthraquinone are obtained from 5 parts of the compound obtained according to Example 6a by saponification, analogously to Example 5b.

EXAMPLE 7

(a) 100 parts of finely powdered sodium 1-isopropylamino-anthraquinone-5-sulphonate are introduced with intensive stirring into a solution of 100 parts of KOH in 300 parts of ethylene glycol at 125°–130°, the mixture is stirred for a further 20 minutes at the same temperature, 15 parts of water are added, the mixture is heated to refluxing, 5–10 parts of water are replenished after 1–2 hours if necessary, and the mixture is kept under reflux until only little sulphonic acid can still be detected in a sample which has been withdrawn and chromatographed (time required, 1½–4 hours, depending on the fineness of division of the sodium 1-isopropylamino-anthraquinone-5-sulphonate employed).

The mixture is stirred whilst cold, and at the same time slowly diluted with 300 parts of water, and the reaction product which has precipitated in a crystalline form and can be easily filtered off is filtered off, washed with hot water until neutral and dried.

1-isopropylamino - 5 - hydroxy-anthraquinone which is free of 1-isopropylamino-5-alkoxy-anthraquinone is obtained.

(b) If, in (a), an equal quantity of ethylene glycol monomethyl ether is employed instead of ethylene glycol, 1-isopropylamino - 5 - hydroxy-anthraquinone which contains slight admixtures of 1-isopropylamino-5-ω-methoxy-ethoxy-anthraquinone is again obtained in a similar reaction.

EXAMPLE 8

(a) 20 parts of ground sodium 1-butylamino-(2')-anthraquinone-5-sulphonate are added at 85° to a solution of 17 parts of NaOH in 60 parts by volume of methanol, and stirring is continued at the boil until only little of the sulphonic acid can still be detected chromatographically in a sample. The mixture is diluted with 200 parts of hot water and the product is filtered off, washed with hot water until neutral and dried. 14.6 parts of 1-butylamino-(2')-5-methoxy-anthraquinone which contains slight admixtures of 1-butylamino-(2')-5-hydroxy-anthraquinone are obtained.

(b) 13.6 parts of the product obtained according to (a) are warmed for 1 hour in 130 parts by volume of 70% strength $H_2SO_4$ to 120°–125°, the mixture is diluted with sufficient water to produce a 30% strength acid, and the resulting precipitate is filtered off, washed until neutral and dried. 11 parts of 1-butylamino-(2')-5-hydroxy-anthraquinone are obtained.

EXAMPLE 9

If the procedure of Example 8a is followed but an equal quantity of sodium 1-pentylamino-(3')-anthraquinone-5-sulphonate is employed instead of 20 parts of sodium 1-butylamino-(2')-anthraquinone-5-sulphonate, 1 - pentylamino-(3')-5-methoxy-anthraquinone is obtained, and its saponification analogously to Example 8b yields 1-pentylamino-(3')-5-hydroxy-anthraquinone.

EXAMPLE 10

18 parts of finely powdered sodium 1-(1'-hydroxy-butyl-amino-(2'))-anthraquinone-5-sulphonate are stirred into a solution of 21 parts of NaOH in 70 parts by volume of methanol at 80° and the mixture is warmed to 90° until no further starting material can be detected (about 15 minutes are required). The mixture is diluted with water and the product is filtered off whilst warm, washed until neutral and dried. A mixture of 1-(1'-hydroxybutylamino-(2'))-5-hydroxy-anthraquinone and 1-(1'-hydroxybutyl-amino-(2'))-5-methoxy-anthraquinone is obtained. The latter compound can be converted into the hydroxy compound by saponification with 65% strength sulphuric acid.

EXAMPLE 11

(a) 90 parts of KOH are dissolved at 90° in 135 parts by volume of methanol, 50 parts of sodium 1-isopropylamino-anthraquinone-5-sulphonate are slowly added thereto at 70°–80°, and the mixture is stirred for a further 2 hours at 90°. The mixture is poured into 1000 parts of water and acidified with concentrated HCl, and the product is washed hot until neutral and dried. 36.2 parts of a mixture of predominantly 1-isopropylamino-5-methoxy-anthraquinone and 1-isopropylamino-5-hydroxy-anthraquinone are obtained.

(b) If the mixture obtained according to (a) is saponified analogously to Example 1b, 1-isopropylamino-5-hydroxy-anthraquinone is obtained in 88% yield on working-up in the same way.

EXAMPLE 12

40 parts by volume of methanol and 10 parts of sodium hydroxide are dissolved at the boil and 13.3 parts of 1-amino-anthraquinone-5-sulphonic acid are introduced into this solution at 80° C., over the course of 30 minutes, with vigorous stirring. The mixture is now stirred for a further 3 hours at 80–85° C. until only traces of starting material are still present according to chromatography. The mixture is now diluted with 50 parts of hot water and the product is filtered off, washed with boiling hot water until neutral and dried at 100–120° C. 8.9 parts of 1-amino-5-methoxy-anthraquinone (80% of theory) are obtained.

EXAMPLE 13

200 parts of sodium 1-methylamino-anthraquinone-5-sulphonate (91.5% strength) are rapidly introduced into a solution of 600 parts by volume of methanol and 180 parts of sodium hydroxide at 75–80° C., with vigorous stirring, and stirred for a further 50 minutes at 80–90° C. until less than 5% of starting material is chromatographically detectable. The mixture is diluted with 1000 parts of hot water and the product is filtered off hot, washed with boiling hot water until neutral and dried at 50° C. in vacuo.

128 parts of 1-methylamino-5-methoxy-anthraquinone (88.5% of theory), containing about 2% of 1-methylamino-5-hydroxy-anthraquinone, are obtained.

EXAMPLE 14

(a) 40 parts of sodium 1-methylamino-anthraquinone-5-sulphonate (91.5% strength) are rapidly added, with vigorous stirring, to a solution of 150 parts by volume of glycol monomethyl ether and 42 parts of sodium hydroxide at 70° C. and the mixture is stirred for a further 15 minutes at this temperature. It is subsequently diluted with 200 parts of hot water and the product is filtered off, washed with boiling hot water until neutral and dried at 60° in vacuo. 26.7 parts of 1-methylamino-5-ω-methoxy-ethoxy-anthraquinone (79% of theory), contaminated with 2% of 1-methylamino-5-hydroxy-anthraquinone, are obtained.

(b) If the procedure described in Example 14a is followed but 150 parts of diglycol monomethyl ether are employed instead of 150 parts of glycol monomethyl ether, 1 - methyl-amino - 5-ω-methoxy-ethoxy-ethoxy-anthraquinone is obtained in good yields.

If the process is carried out in accordance with the conditions indicated in Examples 12–14, using the alcohols B, the compounds C are obtained from the compounds A of the table which follows.

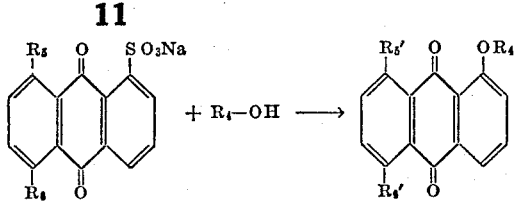

| No. | (A) | | (B) | (C) | | |
|---|---|---|---|---|---|---|
| | $R_5$ | $R_6$ | $R_4$—OH | $R_5'$ | $R_6'$ | $R_4$ |
| 1 | H | —NHC$_4$H$_{11}$ | CH$_3$OH | H | —NHC$_4$H$_{11}$ | —CH$_3$ |
| 2 | H | —NHCH$_3$ | C$_2$H$_5$OH | H | —NHCH$_3$ | —C$_2$H$_5$ |
| 3 | H | —NHCH$_3$ | CH$_3$O(CH$_2$CH$_2$O)$_2$H | H | —NHCH$_3$ | —CH$_2$CH$_2$OCH$_2$CH$_2$OCH$_3$ |
| 4 | H | —NH-n-C$_3$H$_7$ | CH$_3$OH | H | —NH-n-C$_3$H$_7$ | —CH$_3$ |
| 5 | H | —NH$_2$ | CH$_3$OCH$_2$CH$_2$OH | H | NH$_2$ | —CH$_2$CH$_2$OCH$_3$ |
| 6 | NH$_2$ | H | CH$_3$OH | —NH$_2$ | H | —CH$_3$ |

EXAMPLE 15

(a) 150 parts of NaOH are dissolved in 600 parts by volume of methanol at the boil and after cooling, 313.8 parts of sodium anthraquinone-1,5-disulphonate (95.6% strength) are introduced into this solution at 20–30° C. with vigorous stirring, so rapidly that the melt always remains easy to stir (about 30 minutes are required). The mixture is now stirred for a further 48 hours, in the course of which the temperature rises to 35–40° C.; at the same time the initially mobile mixture changes into a thick sludge which can however still be stirred easily. After this time, less than 10% of starting material is present in a sample which is withdrawn and chromatographed. The mixture is diluted with 500 parts of cold water, acidified with 350 parts by volume of concentrated hydrochloric acid whilst cooling with ice, and the product is filtered off, washed with hot water at 90–100° C. until neutral and dried at 100–120° C. 164 parts (80% of theory) of 1,5-dimethoxyanthraquinone (95% strength), still containing 1.5% of 1 - hydroxy-5-methoxy-anthraquinone, are obtained.

(b) Reaction in accordance with the process of German patent specification 156,762:

104.6 parts of sodium anthraquinone-1,5-disulphonate (95.6% strength) are rapidly (about 15 minutes required) introduced into a solution of 1046 parts by volume of methanol and 262 parts by volume of 30% strength sodium hydroxide solution and the mixture is kept under reflux for 72 hours. After pouring into water, the product is filtered off, washed with boiling hot water until neutral and dried at 100–120° C. 38 parts of 84% strength 1,5-dimethoxy-anthraquinone (40% of theory), which inter alia still contain 6.7% of 1-hydroxy-5-methoxy-anthraquinone, are obtained.

The statements regarding the quality of the products in this example, as in the aforementioned and following examples, are based on quantitative column chromatography.

EXAMPLE 16

If the procedure of Example 15a is followed but instead of 600 parts by volume of methanol a mixture of 570 parts by volume of methanol+30 parts by volume of dioxane is employed, a 90% strength 1,5 - dimethoxyanthraquinone is again obtained in good yield (75% of theory).

EXAMPLE 17

150 parts of NaOH are dissolved in 600 parts by volume of methanol at the boil and 333 parts of potassium anthraquinone-1-sulphonate (90% strength) are introduced into this solution with intensive stirring, at 40–45° C., at such speed that the melt always remains easy to stir (about 30 minutes required). The mixture is now stirred for approximately a further 48 hours at 45° C., until only small amounts of starting material are still present in a sample which is withdrawn and chromatographed. The mixture is diluted with 500 parts of cold water and acidified with 350 parts by volume of concentrated hydrochloric acid whilst cooling with ice, and the product is filtered off, washed with hot water at 90-100° C. until neutral and dried at 100–120° C. 204 parts of 97% strength 1-methoxy-anthraquinone (90% of theory), still containing 1.3% of 1-hydroxy-anthraquinone, are obtained.

EXAMPLE 18

600 parts by volume of methanol and 150 parts of sodium hydroxide are dissolved at the boil and 200 parts of 1-chloranthraquinone-5-sulphonic acid are introduced into this solution over the course of one hour at 20–30° C., with vigorous stirring. The mixture is stirred for a further 24 hours at room temperature and is then worked up as described in Example 15a.

114.6 parts of 94% strength 1,5-dimethoxy-anthraquinone (65.5% of theory), which still contains 3% of 1-hydroxy-5-methoxy-anthraquinone, are obtained.

If the process is carried out under the conditions indicated in Examples 15–18, using the appropriate alcohols, the compounds of column B are obtained from the compounds indicated in column A in the table below.

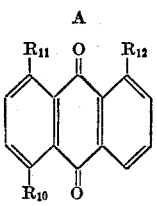 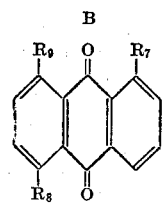

| No. | $R_{12}$ | $R_{10}$ | $R_{11}$ | $R_7$ | $R_8$ | $R_9$ |
|---|---|---|---|---|---|---|
| 1 | SO$_3$Na | H | H | OCH$_2$CH$_2$OC$_2$H$_5$ | H | H |
| 2 | SO$_3$Na | OH | H | OCH$_3$ | OH | H |
| 3 | SO$_3$Na | NO$_2$ | H | OCH$_3$ | OCH$_3$ | H |
| 4 | SO$_3$Na | H | OH | —OCH$_2$—CH$_2$—OC$_2$H$_5$ | H | OH |
| 5 | SO$_3$Na | H | Cl | OCH$_3$ | H | OCH$_3$ |
| 6 | SO$_3$Na | H | NO$_2$ | OCH$_3$ | H | OCH$_3$ |
| 7 | SO$_3$Na | H | SO$_3$Na | OCH$_3$ | H | OCH$_3$ |

We claim:
1. A compound of the formula

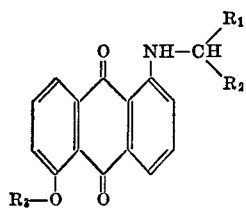

in which $R_1$ and $R_2$ are $C_1$–$C_3$ alkyl or $C_1$–$C_3$ alkyl substituted by chloro, bromo, hydroxy or cyano; and $R_3$ is $C_1$–$C_5$ alkyl or $C_1$–$C_5$ alkyl substituted by hydroxy, lower alkoxy or lower alkoxy lower alkoxy.

References Cited
UNITED STATES PATENTS
3,431,285   3/1969   Schwander _____ 260—371

OTHER REFERENCES

Lubs.: The Chemistry of Synthetic Dyes, pp. 368–370, 1955.

LORRAINE A. WEINBERGER, Primary Examiner
R. GERSTL, Assistant Examiner

U.S. Cl. X.R.

8—39, 40; 260—371, 373, 375, 380, 383

UNITED STATES PATENT OFFICE
CERTIFICATE OF CORRECTION

Patent No. 3,686,232  Dated August 22, 1972

Inventor(s) Walter Hohmann et al

It is certified that error appears in the above-identified patent and that said Letters Patent are hereby corrected as shown below:

Column 2, line 66, "$R_2 =$" should read ---$R_3$---.

Signed and sealed this 28th day of January 1975.

(SEAL)
Attest:

McCOY M. GIBSON JR.
Attesting Officer

C. MARSHALL DANN
Commissioner of Patents